United States Patent
Berneth et al.

(10) Patent No.: US 6,277,307 B1
(45) Date of Patent: Aug. 21, 2001

(54) ELECTROCHROMIC SYSTEM

(75) Inventors: Horst Berneth; Uwe Claussen, both of Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/117,449

(22) PCT Filed: Feb. 4, 1997

(86) PCT No.: PCT/EP97/00499

§ 371 Date: Aug. 3, 1998

§ 102(e) Date: Aug. 3, 1998

(87) PCT Pub. No.: WO97/30135

PCT Pub. Date: Aug. 21, 1997

(30) Foreign Application Priority Data

Feb. 15, 1996 (DE) .............................. 196 05 448

(51) Int. Cl.⁷ .................. G02F 1/00; G02F 1/15
(52) U.S. Cl. .............. 252/583; 359/265; 359/267; 359/272; 359/275
(58) Field of Search .................... 252/583; 359/265, 359/267, 272, 275

(56) References Cited

U.S. PATENT DOCUMENTS

| | | | |
|---|---|---|---|
| 3,280,701 | | 10/1966 | Donnelly et al. ................. 88/77 |
| 3,451,741 | * | 6/1969 | Manos ........................... 359/265 |
| 4,090,782 | * | 5/1978 | Bredfeldt et al. ............... 359/265 |
| 4,093,358 | * | 6/1978 | Shattock et al. ................ 252/583 |
| 4,139,276 | * | 2/1979 | Clecak et al. .................. 359/265 |
| 4,902,108 | * | 2/1990 | Byker .......................... 359/265 |
| 5,290,536 | | 3/1994 | Köcher et al. .................. 424/7.1 |
| 5,300,637 | | 4/1994 | Hatch et al. ................... 518/162 |
| 5,322,680 | | 6/1994 | Beck et al. ..................... 428/71 |
| 5,336,448 | * | 8/1994 | Byker .......................... 252/583 |
| 5,567,360 | * | 10/1996 | Varaprasad et al. ............. 252/583 |
| 5,611,966 | * | 3/1997 | Varaprasad et al. ............. 252/583 |
| 6,183,878 | * | 2/2001 | Berneth et al. ................ 359/265 |

FOREIGN PATENT DOCUMENTS

DE 40 07 058    9/1991 (DE) .
DE 44 35 211    4/1995 (DE) .
EP 0 435 689    7/1991 (EP) .

OTHER PUBLICATIONS

Hünig, S., et al., "Two Step Reversible Redox Systems of the Weitz Type," Topics in Current Chemistry, vol. 92, pp. 1–44 (1980).

Pütter, R., "Umwandlung von Formazanen durch Oxydation: Bildung von Tetrazoliumsalzen," Houben–Weyl, Methoden der Organischen Chemie, vol. 10, No. 3, pp. 685–689 (1965).

Mizuno, K., et al., "Photochemistry of 9,10–Dicyanoanthracene–1,2–Diarylcyclopropane Systems. Photocycloaddition and Photoisomerization," J. Org. Chem., vol. 57, No. 6, pp. 1855–1860, (1992).

Hünig, S., et al., "Bicyclo[1.1.0]butanes. A New Synthetic Route and Valence Isomerization," Journal of the American Chemical Society, vol. 99, No. 18, pp. 6120–6122 (1977).

Deuchert, V.K., et al., "Multistage Organic Redox Systems—A General Structural Principle," Angewandte Chemie—International Edition in English, vol. 17, No. 12, pp. 875–958 (1978).

Tormos, G.V., et al., "Dithiadiazafulvalenes—New Strong Electron Donors. Synthesis, Isolation, Properties, and EPR Studies," J. Am. Chem. Soc., vol. 117, No. 33, pp. 8528–8535 (1995).

Bryce, M.R., et al., "Synthesis and Redox Behaviour of Highly Conjugated Bis(benzo–1,3–dithiole) and Bis (benzothiazole) Systems Containing Aromatic Linking Groups: Model Systems for Organic Metals," J. Chem. Soc. Perkin Trans. 2, pp. 1777–1783 (1990).

* cited by examiner

*Primary Examiner*—Philip Tucker
(74) *Attorney, Agent, or Firm*—Foley & Lardner

(57) ABSTRACT

In the novel electrochromic system comprising at least one oxidizable substance $RED_1$ and at least one reducible substance $OX_2$, each of which, accompanied by an increase in the absorbance in the visible region of the spectrum, is converted from a weakly colored or colorless form into a colored form wherein the reciprocal conversion of oxidized and reducible form takes place by a σ bond being broken or formed, respectively.

14 Claims, No Drawings

ELECTROCHROMIC SYSTEM

The present invention relates to an electrochromic system, an electrochromic fluid comprising this electrochromic system, and an electrochromic device.

Electrochromic devices which contain an electrochromic system are already known.

Such devices customarily contain, as the electrochromic system, redox couples which are dissolved in an inert solvent. Additionally, conducting salts, light stabilizers and substances which affect the viscosity may be included.

Used as a redox couple is one reducible and one oxidizable substance each. Both are colorless or only weakly colored. Under the influence of an electric voltage, one of the substances is reduced and the other is oxidized, at least one becoming colored in the process. After the voltage is switched off, the two original redox substances are formed once more, accompanied by bleaching or fading of the color.

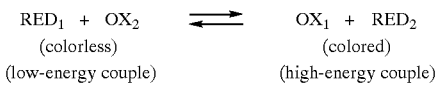

$$RED_1 + OX_2 \rightleftharpoons OX_1 + RED_2$$
(colorless) (colored)
(low-energy couple) (high-energy couple)

U.S. Pat. No. 4,902,108 discloses that those redox couples are suitable in which the reducible substance at least exhibits two chemically reversible reduction waves in the cyclic voltammogram and the oxidizable substance correspondingly exhibits at least two chemically reversible oxidation waves.

Electrochromic devices can be used in many different ways. For example, they may take the form of a car rearview mirror which during a journey at night can be darkened by a voltage being applied and thus prevents dazzling by the headlights of other vehicles (compare e.g. U.S. Pat. No. 3,280,701, U.S. Pat. No. 4,902,108, EP-A-0,435,689). Such devices may further also be employed in window panes or car canopies where, after a voltage has been applied, they black out the sunlight. Finally, such devices may also be used to build up a matrix display for graphic representation of information such as letters, numbers and symbols.

Electrochromic devices normally comprise a pair of glass or plastic panes, one of which being mirrored in the case of a car mirror. One side of these panes is coated with a transparent, electroconductive layer, e.g. indium tin oxide (ITO). These panes are then used to construct a cell by being bonded, preferably cemented, to an annular or rectangular gasket so that their electroconductively coated sides face one another. The gasket establishes a uniform spacing between the panes, for example from 0.1 to 0.5 mm. This cell is then, via a port, filled with an electrochromic solution and is tightly sealed. Via the ITO layer contact can be made separately with the two panes.

The prior art electrochromic systems comprise redox couples which, after reduction and oxidation, form colored free radicals, cationic free radicals or anionic free radicals, which are chemically reactive. As disclosed, for example, by Topics in Current Chemistry, Vol. 92, pp. 1–44 (1980), such (ionic) free radicals may be sensitive with respect to electrophiles or nucleophiles or even free radicals. To achieve a high stability of an electrochromic device containing such an electrochromic system which is to survive several thousands of operating cycles it is therefore necessary to ensure that the solvent used is absolutely free from electrophiles, e.g. protons, nucleophiles and oxygen. It is also necessary to ensure that such reactive species are not formed by electrochemical processes on the electrodes during operation of the electrochromic device.

There was therefore a need for an electrochromic system which comprises at least one electrochromic substance which after reduction or oxidation is not converted into an (ionic) free radical species but has a closed electron shell in the reduced or oxidized form.

The present invention therefore relates to an electrochromic system comprising at least one oxidizable substance $RED_1$ which, by releasing electrons at an anode, is converted from a weakly colored or colorless form into a colored form $OX_1$, and at least one reducible substance $OX_2$ which, by accepting electrons at a cathode, is converted from a weakly colored or colorless form into a colored form $RED_2$, the absorbance in the visible region of the spectrum increasing, in each of these cases, and the weakly colored or colorless form being recovered in each case after charge equalization, wherein the reciprocal conversion of oxidized and reducible form takes place by a α bond being broken or formed, respectively, for at least one of the comprised substances $RED_1$ or $OX_2$.

Preferably, the electrochromic system according to the invention comprises at least one couple of reducible and oxidizable substances $RED_1/OX_2$.

The reduction and oxidation processes in the electrochromic system according to the invention generally take place by electrons being accepted or released at a cathode or anode, respectively, a potential difference of from 0.3 to 3 V preferably obtaining between the electrodes. After the electric potential is switched off, charge equalization generally takes place spontaneously between the substances $RED_2$ and $OX_1$, accompanied by bleaching or fading of the color. Such a charge equalization also takes place even while the current is, flowing in the interior of the electrolyte volume.

The electrochromic system according to the invention preferably comprises, as the reducible substance $OX_2$, a cyclic organic compound which, after accepting 1 or 2 electrons, is converted, one of the σ bonds of the ring being broken, into an open-ring compound and which, by releasing 1 or 2 electrons, is converted once more into the cyclic starting compound, in each case precisely two electrons being transferred overall, however.

Said ring opening may take place, for example, by two electrons being accepted directly, resulting in breaking of the bond. Alternatively it is possible for one electron to be accepted initially, whereupon ring opening takes place which may then be followed by further reactions such as a further electron and/or a proton being accepted and/or an anionic leaving group being eliminated, precisely 2 electrons being accepted overall, however. Said ring opening results in an altered π electron system which has a corresponding higher-wavelength and/or higher-absorbance light absorption. Ring closure may correspondingly take place by simultaneous release of two electrons or successively by release of first one electron and possibly a further electron, and/or the proton which may have been bound is eliminated again and/or the eliminated anionic leaving group is bound once more, precisely 2 electrons being released overall, however.

The reducible substance $OX_2$ which is comprised in the electrochromic system according to the invention and comprises, as the reducible substance $OX_2$ which is converted reversibly, a ring a bond being broken, into the corresponding open-ring substance $RED_2$, is, in particular, a compound selected from the group consisting, of the tetrazolium salts, benzo- or naplhthotriazolium salts, cyclopropanes and [1.1.0]bicyclobutanes. As a result of electrons being accepted and bonds breaking, the corresponding colored compounds from the group consisting of the formazans, amino-azo-benzenes, amino-azo-naphthalenes, 1,3-dimethylenepropanes and 1,3-dimethylenecyclobutanes are then formed therefrom.

The tetrazolium salts, naphthotriazolium salts, cyclopropanes and [1.1.0]bicyclobutanes are preferably those compounds of the formulae (I) to (IV)

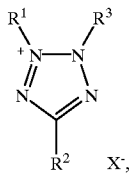
(I)

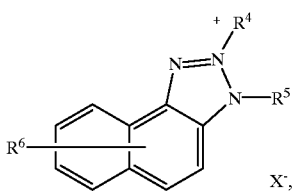
(II)

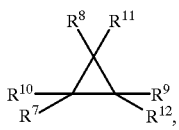
(III)

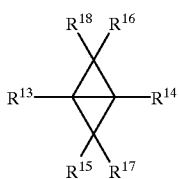
(IV)

in which $R^1$ to $R^5$, independently of one another, represent $C_6$- to $C_{10}$-aryl or an aromatic or quasi-aromatic five- or six-membered heterocyclic ring, each of which is optionally benzanellated, $R^7$, $R^9$, $R^{13}$ and $R^{14}$, independently of one another, represent a radical of the formulae (V) to (VII)

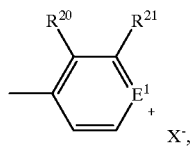
(V)

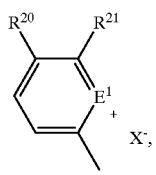
(VI)

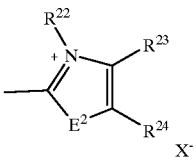
(VII)

$R^8$, $R^{15}$ and $R^{16}$, independently of one another, represent $C_6$- to $C_{10}$-aryl, $C_7$–$C_{11}$-aroyl or a radical of the formulae (V) to (VII), $R^{10}$ to $R^{12}$, $R^{17}$ and $R^{18}$, independently of one another, represent hydrogen, $C_1$- to $C_4$-alkyl, halogen or cyano, $E^1$ and $E^2$, independently of one another, represent O, S or N—$R^{19}$, $R^{19}$ and $R^{22}$, independently of one another, represent $C_1$- to $C_{18}$-alkyl, $C_2$- to $C_8$-alkenyl, $C_4$- to $C_7$-cycloalkl, $C_7$- to $C_{15}$-aralkyl or $C_6$- to $C_{10}$-aryl, $R^6$, $R^{20}$, $R^{21}$, $R^{23}$ and $R^{24}$, independently of one another, represent hydrogen, $C_1$- to $C_4$-alkyl, $C_1$- to $C_4$-alkoxy, halogen, cyano, nitro or $C_1$- to $C_4$-alkoxycarbonyl, or $R^{20}$ and $R^{21}$, or $R^{23}$ and $R^{24}$, jointly form a —CH═CH—CH═CH— bridge, and X⁻ represents a colorless anion which is redox-inert under the conditions.

Those compounds of formulae (I) to (IV) are preferred in which $R^1$ to $R^5$, independently of one another, represent a radical of the formulae

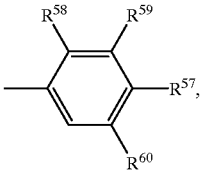
(XIX)

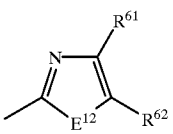
(XX)

in which $R^{57}$ to $R^{62}$, independently of one another, represent hydrogen, $C_1$- to $C_6$-alklyl, $C_1$- to $C_6$-alkoxy, hydroxy, halo(gen, cyano, nitro, di-($C_1$- to $C_4$-alkyl)amino, tri-($C_1$- to $C_4$-alkyl)ammonium, $C_1$- to $C_6$-alkanoylamino, benzoylanmino, $C_1$- to $C_6$-alkylsulfonylamino, benzenesulfonylamino, $C_1$- to $C_4$-alkoxycarbonyl or COOH, or radicals juxtaposed in pairs jointly form an —O—$(CH_2)_{2-3}$—, —O—$(CH_2)_{1-2}$—O—, —$NR^{63}$—$(CH_2)_{2-3}$— or —$NR^{63}$—$(CH_2)_{1-2}$—O— bridge, or $R^{58}$ and $R^{59}$ and/or $R^{61}$ and $R^{62}$ form a —CH═CH—CH═CH— bridge which may be substituted by methyl, methoxy or chlorine, $R^{63}$ represents hydrogen or $C_1$- to $C_4$-alkyl, $E^{12}$ represents O, S or $NR^{64}$, $R^{64}$ represents hydrogen, $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^7$, $R^9$, $R^{13}$ and $R^{14}$ represent a radical of formula (V) and are pairwise identical, $R^8$, $R^{15}$ and $R^{16}$ represent phenyl or a radical of formula (V), and $R^{15}$ and $R^{16}$ are identical, $R^6$, $R^{10}$ and $R^{12}$ represent hydrogen, $R^{11}$ represents hydrogen, methyl, cyano or chlorine, $R^{17}$ and $R^{18}$ represent hydrogen or methyl and are identical, $E^1$ represents O or $NR^{19}$, $R^{19}$ represents $C_1$- to $C_{12}$-alkyl, $C_2$- to $C_4$-alkenyl, cyclohexyl, benzyl or phenyl, $R^{20}$ and $R^{21}$ represent hydrogen or jointly form a —CH=CH—CH=CH— bridge, and X represents a colorless anion which is redox-inert under the conditions.

The electrochromic system according, to the invention, which preferably comprises, as oxidizable substances $RED_1$, those organic compounds which are able to release 2 electrons reversibly in two stages, a higher-wavelength and/or stronger light absorption being achieved, in particular, after one electron has been released.

In a cyclic voltammogram, recorded in an inert solvent, these substances $RED_1$ exhibit at least 2, as a rule precisely 2, electrochemically and chemically reversible oxidation states which are each caused by an electron being released. Such substances are disclosed, for example, by Topics in Current Chemistry, Vol. 92, pp. 1–44 (1980) and are likewise, as previously quoted, employed in an electrochromic device in U.S. Pat. No. 4,902,108.

Among such substances reversibly oxidizable in 2 stages those are preferred which have a difference of at least 250 mV between their two oxidation states.

The substances which are reversibly oxidizable in two stages are preferably to be understood as those compounds which correspond to one of the formulae (VIII) to (XVIII)

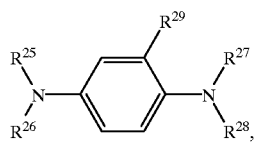
(VIII)

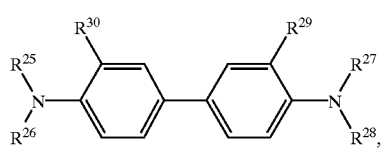
(IX)

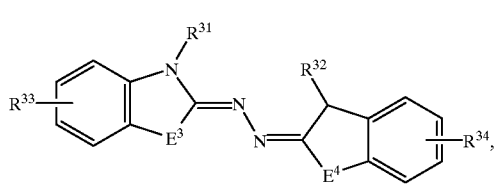
(X)

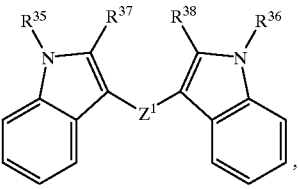
(XI)

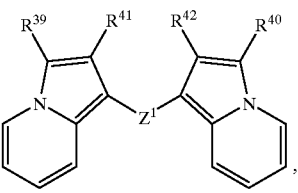
(XII)

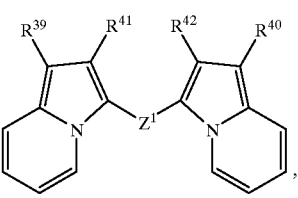
(XIII)

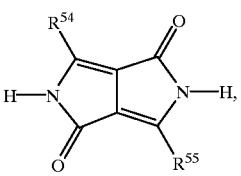
(XIV)

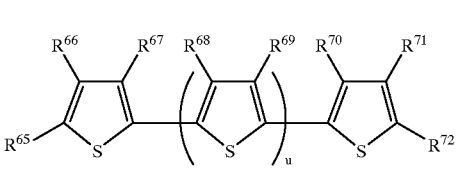
(XV)

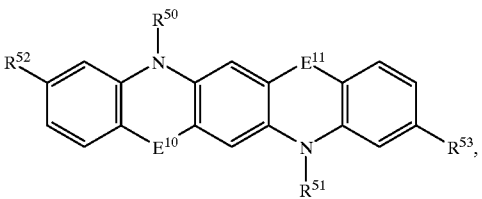
(XVI)

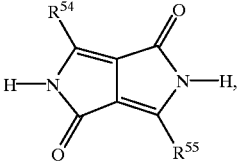
(XVII)

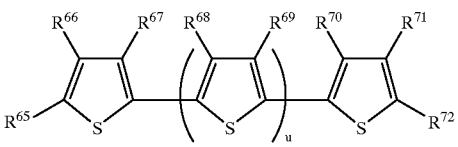
(XVIII)

in which
$R^{25}$ to $R^{28}$, $R^{31}$, $R^{32}$, $R^{35}$, $R^{36}$, $R^{43}$, $R^{50}$ and $R^{51}$, independently of one another, represent $C_1$- to $C_{18}$-alkyl, $C_2$- to $C_{12}$-alkenyl, $C_4$- to $C_7$-cycloalkyi, $C_7$- to $C_{15}$-aralkyl or $C_6$- to $C_{10}$-aryl, and $R^{43}$, $R^{50}$ and $R^{51}$ may additionally represent hydrogen, $R^{29}$, $R^{30}$, $R^{33}$, $R^{34}$, $R^{37}$, $R^3$, $R^{39}$ to $R^{42}$, $R^{44}$, $R^{45}$, $R^{46}$ to $R^{49}$ and $R^{52}$ to $R^{55}$, independently of one another, represent hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl, and $R^{54}$ and $R^{55}$ additionally represent an aromatic or quasi-aromatic five- or six-membered heterocyclic ring, each of which is optionally benzanellated, or a radical of the formulae (V) or (VI), and $R^{45}$ may additionally represent $NR^{73}R^{74}$, or $R^{46}$ and $R^{47}$ and/or $R^{48}$ and $R^{49}$ form a —$(CH_2)_3$—, —$(CH_2)_4$—, —$(CH_2)_5$— or —CH=CH—CH=CH— bridge, $Z^1$ represents a direct bond, a —CH=CH— or —N=N— bridge, =$Z^2$= represents a direct double bond, a =CH—CH= or =N—N= bridge, $E^3$ to $E^5$, $E^{10}$ and $E^{11}$, independently of one another, represent O, S, $NR^{56}$ or $C(CH_3)_2$, and $E^5$ may additionally represent C=O or $SO_2$, or $E^3$ and $E^4$, independently of one another, additionally represent —CH=CH—, $E^6$ to $E^9$, independently of one another, represent S, Se or $NR^{56}$, $R^{56}$, $R^{73}$ and $R^{74}$, independently of one another, represent $C_1$- to $C_{12}$-alkyl, $C_2$- to $C_8$-alkenyl, $C_4$- to $C_7$-cycloalkyl, $C_7$- to $C_{15}$-aralkyl or $C_6$- to $C_{10}$-aryl, and $R^{73}$ may additionally represent hydrogen, or $NR^{73}R^{74}$ represent a five- or six-membered saturated ring which may contain further heteroatoms, $R^{65}$ to $R^{72}$, independently of one another, represent hydrogen, $C_1$- to $C_6$-alkyl, $C_1$- to $C_4$-alkoxy, cyano, $C_1$- to $C_4$-alkoxycarbonyl or $C_6$- to $C_{10}$-aryl, and $R^{65}$ and $R^{66}$, and $R^{71}$ and $R^{72}$, independently of one another, may additionally form a —$(CH_2)_3$—, —$(CH_2)_4$— or —CH=CH—CH=CH— bridge, and u represents an integer between 0 and 10.

Preference is given to compounds of the formulae (XIII) to (XVIII) in which $R^{25}$ to $R^{28}$, $R^{31}$, $R^{32}$, $R^{35}$, $R^{36}$, $R^{43}$, $R^{50}$ and $R^{51}$, independently of one another, represent $C_1$- to $C_{12}$-allkyl, $C_2$- to $C_8$-alkenyl, cyclohexyl, benzyl or phenyl, and $R^{43}$, $R^{50}$ and $R^{51}$ may additionally represent hydrogen, $R^{29}$, $R^{30}$, $R^{33}$, $R^{34}$, $R^{37}$, $R^{38}$, $R^{39}$ to $R^{42}$, $R^{44}$, $R^{45}$, $R^{46}$ to $R^{49}$ and $R^{52}$ to $R^{55}$, independently of one another, represent hydrogen, methyl, ethyl, methoxy, ethoxy, fluorine, chlorine, bromine, cyano, nitro, methoxycarbonyl, ethoxycarbonyl or phenyl, and $R^{54}$ and $R^{55}$ may additionally represent 2- or 4-pyridyl, or a radical of the formulae (V) or (VI), and $R^{45}$ may additionally represent $NR^{73}R^{74}$, or $R^{46}$ and $R^{47}$ and/or $R^49$ and $R^{49}$ form a —$(CH_2)_3$—, —$(CH_2)_4$—, —$(CH_2)_5$— or —CH=CH—CH=CH— bridge, $Z^1$ represents a direct bond, a —CH=CH— or —N=N— bridge, =$Z^2$= represents a direct double bond, a =CH—CH= or =N—N= bridge, $E^3$ to $E^5$, $E^{10}$ and $E^{11}$, independently of one another, represent O, S or $NR^{56}$, and $E^5$ may additionally represent C=O, $E^6$ to $E^9$, independently of one another, represent S or Se, $R^{56}$, $R^{73}$ and $R^{74}$, independently of one another, represent $C_1$- to $C_8$-alkyl, $C_2$- to $C_4$-alkenyl, cyclohexyl, benzyl or phenyl, and $R^{73}$ may additionally represent hydrogen, or $NR^{73}R^{74}$ represents pyrrolidino, piperidino or morpholino, $R^{65}$, $R^{66}$, $R^{71}$ and $R^{72}$, independently of one another, represent hydrogen, $C_1$- to $C_4$-allkcyl, methoxycarbonyl, ethoxycarbonyl or phenyl or pairwise form a —$(CH_2)_3$— or —$(CH_2)_4$— bridge, $R^{67}$ to $R^{70}$ represent hydrogen and u represents an integer from 0 to 6.

The electrochromic system according to the invention preferably comprises at least one couple of oxidizable and reducible substances $RED_1/OX_2$, suitable substances $OX_2$ preferably being those of the formulae (I) to (IV) in their general and preferred meanings, and suitable substances $RED_1$ preferably being those of the formulae (VIII) to (XVIII) in their general and preferred meanings.

Special preference is given to an electrochromic system comprising a couple $RED_1/OX_2$, the substance $OX_2$ being a tetrazolinium salt of formula (T), and the substance $RED_1$ being a compound selected from the group consisting of the formulae (VIII), (X), (XI), (XIV) and (XV), in which $R^1$ and $R^2$ correspond to a radical of formula (XIX), $R^3$ corresponds to a radical of formula (XX), $R^{57}$, $R^{59}$ and $R^{60}$, independently of one another, represent hydrogen, methyl, ethyl, methoxy, ethoxy, cyano, nitro, —$N^+(CH_3)_3$ or COOH, or $R^{57}$ and $R^{59}$ jointly form an —O—$CH_2$—O— bridge, $R^{58}$ represents hydrogen, methyl, methoxy or chlorine, $R^{61}$ represents methyl, difluoromethyl, trifluoromethyl, methoxycarbonyl, ethoxcycarbonyl or phenyl, $R^{62}$ represents hydrogen, methyl, ethyl, phenyl or chlorine, or $R^{61}$ and $R^{62}$ together form a —CH=CH—CH=CH— or —CH=CH—C(OCH$_3$)=CH— bridge, $E^{12}$ represents S, $X^-$ represents a colorless anion which is redox-inert under the conditions, $R^{25}$ to $R^{28}$, $R^{31}$, $R^{32}$, $R^{35}$, $R^{36}$, $R^{43}$ and $R^{56}$ represent methyl, ethyl, propyl, butyl, pentyl, hexyl or benzyl, $R^{25}$ to $R^{28}$, $R^{31}$ and $R^{32}$, and $R^{35}$ and $R^{36}$, respectively, being identical and $R^{43}$ may additionally represent hydrogen, $R^{29}$ and $R^{44}$ represent hydrogen, $R^{45}$ represents hydrogen, methoxy, ethoxy, dimethylamino, diethylamino, anilino, N-methylanilino or piperidino, $R^{33}$ and $R^{34}$ are identical and represent hydrogen, methyl, methoxy, chlorine, cyano or methoxycarbonyl, $E^3$ to $E^5$ represent O, S or $NR^{56}$, but $E^3$ and $E^4$ are identical, $R^{37}$ and $R^{38}$ are identical and represent hydrogen, methyl, ethyl, propyl, butyl or phenyl, $Z^1$ represents a direct bond or —CH=CH—, $R^{46}$ to $R^{49}$ are identical and represent hydrogen, methyl, methoxy, chlorine, cyano, methoxycarbonyl, ethoxycarbonyl or phenyl, $E^6$ to $E^9$ are identical and represent S, Se or ,$R^{56}$, =$Z^2$= represents a direct double bond, a =CH—CH= or =N—N= bridce, $R^{65}$ and $R^{66}$, and $R^{71}$ and $R^{72}$ represent a —$(CH_2)_3$— or —$(CH_2)_4$— bridge, $R^{67}$ to $R^{70}$ represent hydrogen, and u represents an integer from 1 to 6.

In a particular embodiment, the electrochromic system according to the invention, comprises a couple of oxidizable and reducible substances $RED_1/OX_2$, $RED_2$ and $OX_2$ being linked via a bridge B, in which B represents a bridge of the formulae $-(CH_2)_n-$ or $-[Y^1{}_s-(CH_2)_m-Y^2]_o-(CH_2)_p-Y^3{}_q-$, which may be substituted by $C_1$- to $C_4$-alkyl, $C_1$- to $C_4$-alkoxy, halogen or phenyl, $Y^1$ to $Y^3$, independently of one another, represent O, S, $NR^{63}$, COO, CONH, NHCONH, cyclopentanediyl, cyclohexanediyl, phenylene or naphthylene, $R^{63}$ represents $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n represents an integer from 1 to 12, m and p, independently of one another, represent an integer from 0 to 8, o represents an integer from 0 to 6, q and s, independently of one another, represent 0 or 1, and $OX_2$ preferably is a compound of the formulae (1) to (IV), with the general and preferred meanings of the substituents as specified for these formulae and $RED_1$ preferably being a compound of the formulae (VIII) to (XVIII) with the general and preferred meanings of the substituents for these formulae, the linkage with the bridge B being effected via the radicals $R^{19}$, $R^{21}$ to $R^{25}$, $R^{31}$, $R^{35}$, $R^{39}$, $R^{41}$, $R^{43}$, $R^{46}$, $R^{50}$, $R^{54}$, $R^{56}$, $R^{57}$, $R^{59}$, $R^{61}$, $R^{62}$, $R^{64}$, $R^{65}$ or $R^{66}$ which in this case constitute a direct bond to the bridge B, or $R^{46}$, $R^{57}$ or $R^{59}$ for mi a single bond —COO— bridge to the bridge B.

In the abovementioned meanings of the substituents, alkyl radicals including modified ones such as e.g. alkoxy or aralkyl radicals are preferably those having from 1 to 12 C atoms, in particular having from 1 to 8 C atoms, unless specified otherwise. They may be straight-chained or branched and optionally carry further substituents such as e.g. $C_1$- to $C_4$-alkoxy, fluorine, chlorine, hydroxy, cyano, $C_1$- to $C_4$-alkoxycarbonyl or COOH.

Cycloalkyl radicals are preferably to be understood as those having from 3 to 7 C atoms, in particular 5 or 6 C atoms.

Alkenyl radicals are preferably those having from 2 to 8 C atoms, in particular from 2 to 4 C atoms.

Aryl radicals, including those in aralkyl or aroyl radicals, are preferably phenyl or naphthyl radicals, in particular phenyl radicals. They may be substituted by from 1 to 3 of the following radicals: $C_1$- to $C_6$-alkyl, $C_1$- to $C_6$-alkoxy, fluorine, chlorine, bromine, cyano, hydroxy, $C_1$- to $C_6$-alkoxycarbonyl or nitro. It is also possible for two adjacent radicals to form a ring.

Aromatic or quasi-aromatic five- or six-membered heterocyclic rings, each of which may optionally be benzanellated, refer, in particular, to imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted by from 1 to 3 of the following radicals: $C_1$- to $C_6$-alkyl, $C_1$- to $C_6$-alkoxy, fluorine, chlorine, bromine, cyano, nitro, hydroxy, mono- or di-($C_1$- to $C_6$-alkyl)amino, $C_1$- to $C_6$-alkoxycarbonyl, $C_1$- to $C_6$-alkylsulfonyl, $C_1$- to $C_6$-alkanoylamino, phenyl or naphthyl. It is also possible for two adjacent radicals to form a ring.

Tetrazolium salts of formula (I) are disclosed, for example, by Houben-Weyl, Methoden der organischen Chemie, Volume 10/3, p. 685 (1965), EP-A 476,455, EP-A 476,456, EP-A 476,457, naphthotriazolium salts of formula (II) are disclosed, for example, by German Offenlegungsschrift 4,007,058, cyclopropanes of formula (III) are disclosed for example, by J. OrgF Cliem. 57, 1849 (1992), [1.1.0]bicyclobutanes are disclosed, for example, by J. Am. Chem. Soc. 99, 6120, 6122 (1977) or can be prepared in a manner similar thereto.

The reversibly oxidizable substances $RED_1$ of formulae (VIII) to (XVIII) are disclosed, for example, by Topics in Current Chemistry, Vol. 92, pp. 1–44 (1980), Angew. Chem 90, 927 (1978), J. Am. Chem. Soc. 117, 8528 (1995), J. C. S. Perkin II, 1990, 1777 and German Offenlegungsschrift 4,435,211 or by the literature cited there or can be prepared in a similar manner.

The electrochromic system according to the invention preferably comprises at least one solvent, an electrochromic fluid being produced as a result which is likewise a subject matter of the invention.

Suitable solvents include all solvents which are redox-inert under the voltages selected and which cannot dissociate to form electrophiles or nucleophiles or themselves react as sufficiently strong electrophiles or nucleophiles and thus could react with the coloreld ionic free radicals. Examples are propylene carbonate, γ-butyrolactone, acetonitrile, propionitrile, glutaronitrile, methylglutaronitrile, 3,3'-oxydipropionitri le, hydroxypropionitrile, dimethylformami de, N-methylpyrrolidone, sulfolane, 3-methylsulfolane or mixtures thereof. Preferred are propylene carbonate and mixtures thereof with glutaronitrile or 3-methylsulfolane.

The electrochr-omic fluid according to the invention may contain at least one inert conducting salt.

Suitable inert conducting salts include lithium salts, sodium salts and tetraalkylammonium salts, in particular the latter. The alkyl groups may have from 1 to 18 C atoms and may be identical or different. Preference is given to tetrabutylammonium. Anions suitable for these salts but also as anions $X^-$ in the formulae (I), (II), (IV), (VI), (VII) include all redox-inert, colorless anions. Examples are tetrafluoroborate, perchlorate, methanesulfonate, trifluoromethanesulfonate, perfluorobutanesulfonate, benzenesulfonate, hexafluorophosphate, hexafluoroarsenate and hexafluorosilicate. In the latter case, $X^-$ represents $½SiF_6{}^{2-}$.

The conducting salts are employed, for example, in the rang,e of from 0 to 1 molar.

Further additives to the electrochromic fluid may include thickeners, to control the viscosity of the fluid. This may matter in avoiding segregation, i.e. the formation of stripy or patchy coloration upon prolonged operation of an energized electrochromic device containing the electrochromic fluid according to the invention, and for controlling the bleaching rate once the current has been switched off.

Suitable thickeners include all compounds customary for these purposes, such as e.g. polyacrylate, polymethacrylate (Luctile L®), polycarbonate and polyurethane.

The electrochromic fluid may also be in the form of a gel.

Suitable further additives for the electfochromic fluid include UV absorbers to improve the lightfastness. Examples are UVINUL® 3000 (2,4-dihydroxybenzophenone, BASF), SANDUVORE 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24™ (2,2'-dihydroxy-4-methoxybenzophenone, American Cyanamid Company), UVINUL® 3035 (ethyl 2-cyano-3,3-diphenylacrylate, BASF), UVINUL® 3039 (2-ethylhexyl 2-cyano-3,3-diphenylacrylate, BASF), UVINUL® 3088 (2-ethylhexyl p-methoxycinnamate, BASF).

The UV absorbers are employed in the range of from 0.01 to 2 mol/l, preferably from 0.04 to 1 mol/l.

The electrochromic fluid contains each of the electrochromic substances $OX_2$ and $RED_1$, in particular those of the formulae (I) to (IV) and (VIII) to (XVIII), in a concentration of at least $10^{-4}$ mol/l, preferably from 0.001 to 0.5 mol/l. The total concentration of all the electrochromic substances present is preferably below 1 mol/l.

$RED_1$ and $OX_2$ are employed in the ratio of from 1:3 to 3:1, preferably from 1:1 to 1:2.

The electrochromic fluids according to the invention are eminently suitable as a component of an electrochromic device. The present invention therefore further relates to electi-ocliromic devices containing an electrochromic fluid according to the invention. The design of an electrochromic device which may be configured, e.g., as a soler cell window pane, car canopy, car rearview mirror or display, is known in principle. The electrocliromic device according to the invention comprises two transparent glass or plastic panes which face one another, one of which is optionally mirrored and whose sides which face one another are coated electroconductively, e.g. with indium tin oxide (ITO), between which the electrochromic fluid according to the invention is located. Other conductive materials are likewise suitable: tin oxide, tin oxide doped with antimony or fluorine, zinc oxide doped with antimony or aluminum. Conductive organic polymers such as polythienyls, polypyrroles, polyanilines, polyacetylene, each of which is optionally substituted, are likewise suitable. If one of the panes is mirrored, it may likewise be utilized as a conductive layer. The spacing of the two panes is. generally 0.005–2 mm, preferably 0.2–0.5 mm. The desired spacing between the panes is generally established by means of a gasket.

In addition to the above-described substances $RED_1$, $OX_2$, the electrochromic system according to the invention may also contain others such as those described, for example, in U.S. Pat. No. 4,902,108, Topics in Current Chemistry, Vol. 92, pp. 1–44 (1980) and Angew. Chem. 90 927 (1978). Reference is made to those in particular which may be converted reversibly, by reduction, into a colored form. Such electrochrornic substances stem, for example, from the groups of the viologens and the redox systems related thereto, which have quaternized quasi-aromatic five-membered rings as end systems, p-diaminobenzenes and diaminobiphenyls, quinones, quinone imines and quinodimethanes. An admixture of such redox systems may be advantageous, for example, to correct the hue of e.g. the display, when energized, in the case of the electrochromic device according to the invention.

EXAMPLES

Example 1

A display cell like that described in U.S. Pat. No. 4,902, 108 in Examples 1 to 3 was constructed from two glass plates coated with indium tin oxide (ITO) and a gasket. Via a port in the gasket it was filled withi a solution of tetrazoliutm salt (0.025 molar) of formula

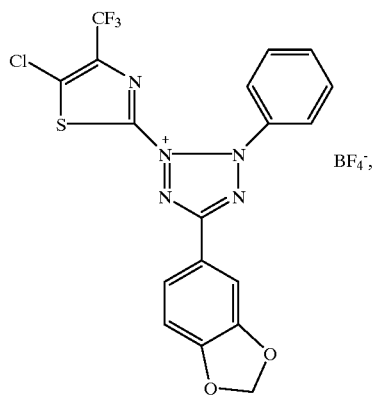

(XXI)

tetrathiafulvalene (0.025 molar) of the formula

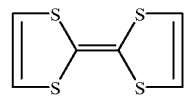

(XXII)

and tetrabutylammonium tetrafluoroborate (0.5 molar) in anhydrous propylene carbonate. The color of the solution in the cell was pale yellow. After a voltage of 1.5 V was applied, the solution rapidly turned deep red, after the power supply was switched off the cell contents bleached once more within about 30 s, resulting in the original pale yellow. More than 100 such operating cycles were survived without any changes.

If the one glass pane was silvered opposite its ITO-coated side, a mirror was obtained which could be darkened.

Example 2

A display cell as in Example 1 was constructed. It was filled with a solution of tetrazoliurn salt (0.025 molar) of formula (XXI), (see Example 1), N-methylphenothiazine (0.025 molar) of formula

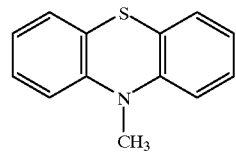

(XXIII)

and tetrabutylammonium tetrafluoroborate (0.5 molar) in anhydrous propylene carbonate. The color of the solution in the cell was pale yellow. After a voltage of 1.5 V was applied, the solution rapidly turned deep bluish-red, after the power supply was switched off the cell contents bleached once more within about 30 s, resulting in the original pale yellow. More than 100 such operating cycles were survived without any changes.

Example 3

A display cell as in Example 1 was constructed. Beforehand, however, as described in U.S. Pat. No. 4,902, 108, Example 10, one of the glass plates was coated, on the ITO-coated side, with a solution of a polyacrylate and the solvent was evaporated. Then the cell was filled with a solution of tetrazolium salt (0.017 molar) of formula (XXIV)

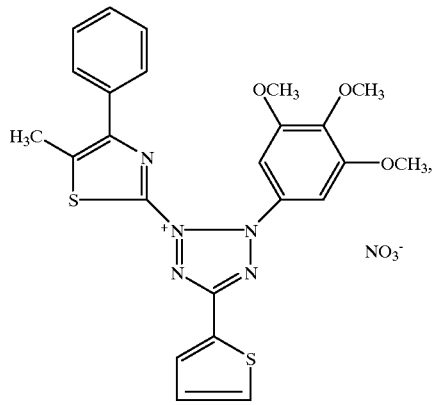

N-butylphenothiazine (0.033 molar) of formula (XXV)

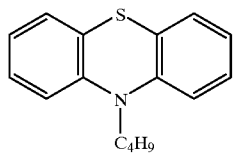

and tetrabutylammonium tetrafluoroborate (0.5 molar) in a 4:2 mixture of anhydrous propylene carbonate and anhydrous glutaronitrile via a port in the gasket. The solution thickened by the polyacrylate was yellow with a slight green cast After a voltage of 1.5 V was applied, it rapidly turned red-brown After the voltage was switched off, the solution bleached again. Shorting the cell accelerated the bleaching process. More than 100 such operating cycles were survived without any changes.

Example 4

A display cell as in Example 1 was constructed. It was filled with a solution of tetrazolium salt (0.025 molar) of formula (XXVI)

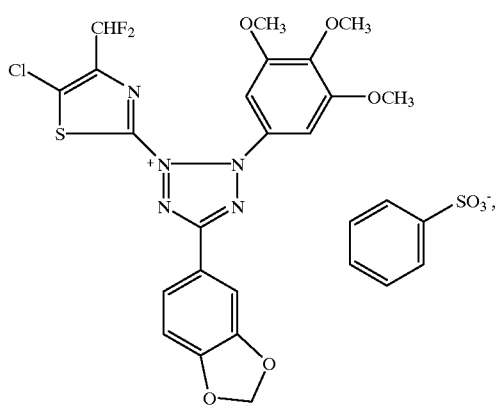

N-methylphenothiazine (0.025 molar) of formula (XXIII) (see Example 2) and tetrabutylammonium tetrafluoroborate (0.5 molar) in anhydrous propylene carbonate. The color of the solution in the cell was pale yellow. After a voltage of 1.5 V was applied, the solution rapidly turned deep red, after the power supply was switched off the cell contents bleached once more within about 30 s, resulting in the original pale yellow. More than 100 such operating cycles were survived without any changes. After 1 h of continuous operation in the energized state, operation of the display was unaffected.

In an entirely similar manner, employing the following electrochromic substances listed in the table, electrochromic display cells were constructed and similarly good results were achieved.

TABLE

| Ex. | OX$_2$ | RED$_1$ | Color |
|---|---|---|---|
| 5 | [structure with Cl, CF$_3$, thiazole, tetrazolium, phenyl, methylenedioxyphenyl, BF$_4^-$] | [bis-benzothiazole structure with N-CH$_2$-phenyl groups] | purple |

| | | | |
|---|---|---|---|
| 6 | 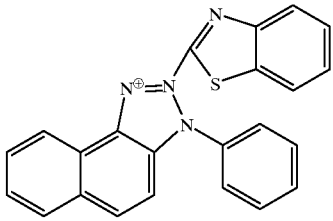 | 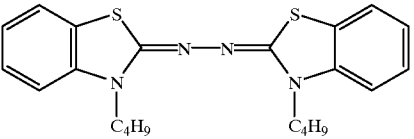 | black-purple |
| 7 | 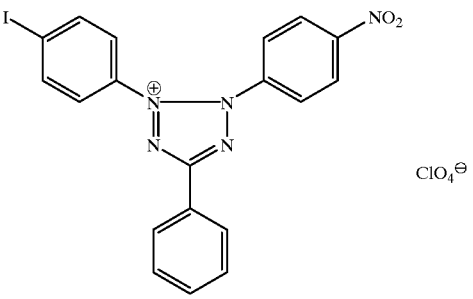 | 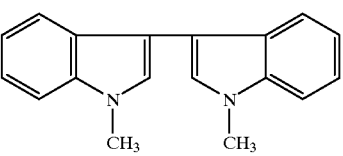 | purple |
| 8 | 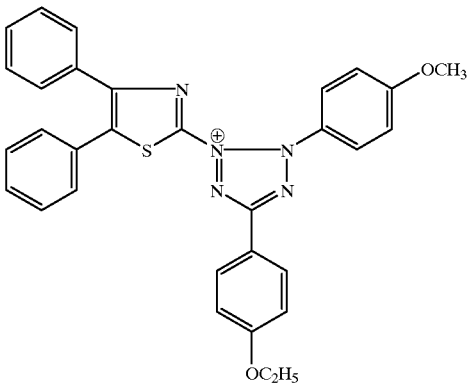 | 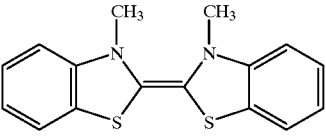 | red |
| 9 | 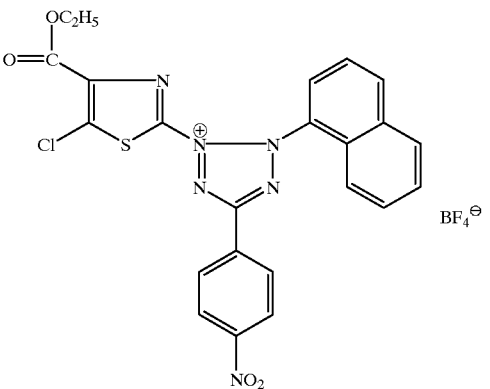 | 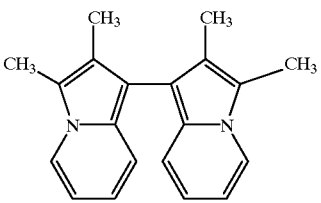 | purple |

TABLE-continued
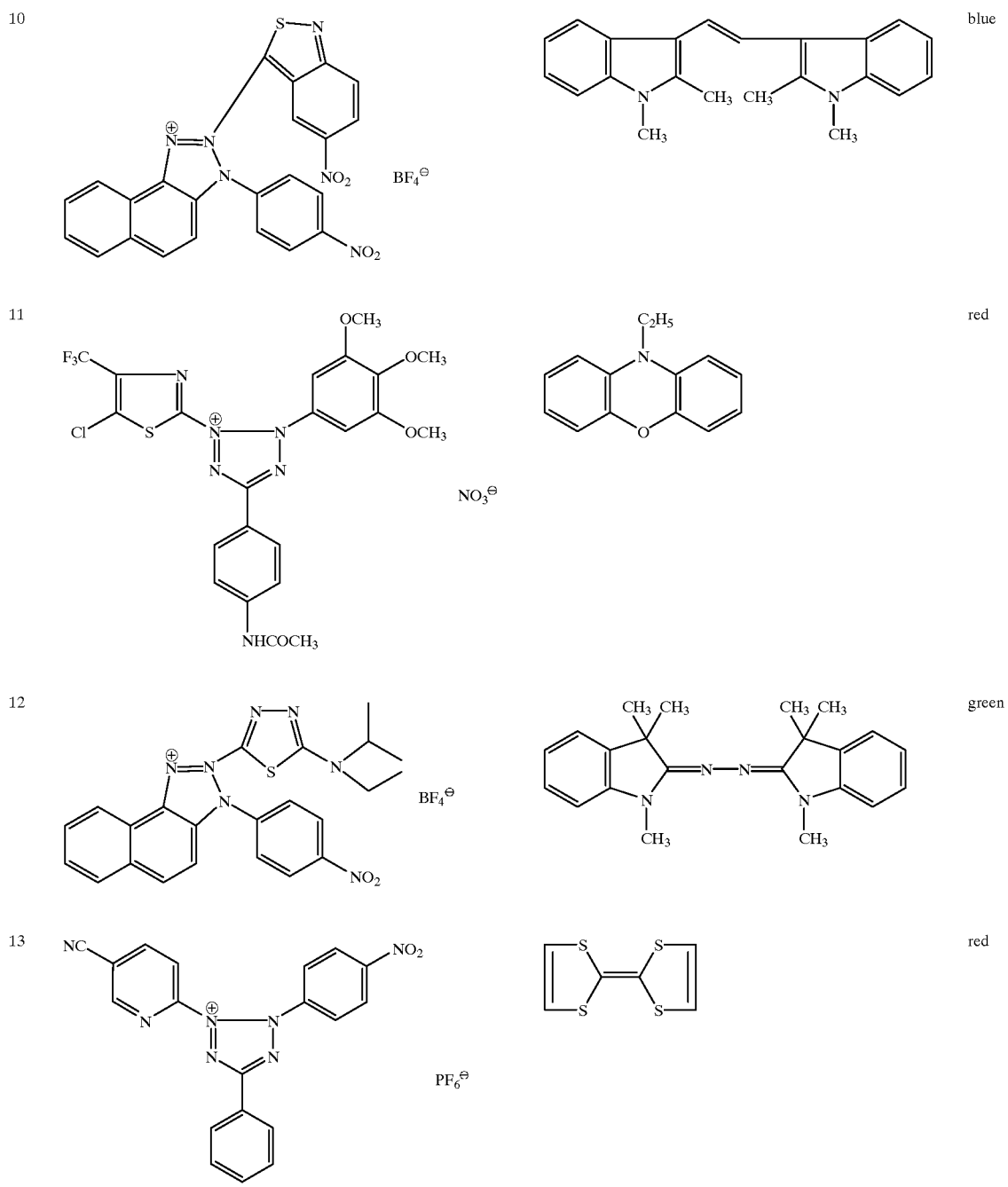

TABLE-continued

| 14 | [structure: 4,5-diphenylthiazole linked to tetrazolium with 2-carboxyphenyl and benzo[1,3]dioxole substituents] | [structure: bis(trimethylpyrrolo[2,1-a]pyridine) azo compound] | purple |
| 15 | [structure: 4-phenyl-5-methylthiazole tetrazolium with 4-trimethylammoniumphenyl and 4-methoxyphenyl substituents], 2 BF$_4^\ominus$ | [structure: tetrathiafulvalene tetracarboxylate tetramethyl ester] | red |
| 16 | [structure: 4-(4-methoxyphenyl)-5-isopropylthiazole tetrazolium with 4-carboxyphenyl and 2-chloro-5-nitrophenyl substituents], CH$_3$SO$_3^\ominus$ | [structure: 3,7-dimethyl-10-methylphenothiazine] | purple |
| 17 | [structure: 6-methoxybenzothiazole tetrazolium with 4-ethoxyphenyl and 3,4-dimethylphenyl substituents], BF$_4^\ominus$ | [structure: 3-(phenylamino)-10H-phenothiazine] | purple |

TABLE-continued

| | | | | |
|---|---|---|---|---|
| 18 | [structure: 2-(4-methoxyphenyl)-3-(2,4-dimethylphenyl)-5-(4-pyridyl)tetrazolium] BF₄⁻ | | [structure: 10-phenylphenothiazine] | red |
| 19 | [structure: 2-(4-nitrophenyl)-3-(4-methoxyphenyl)-5-(4-pyridyl)tetrazolium] BF₄⁻ | | [structure: tetracyano-TTF] | red |
| 20 | [structure: 1,2-bis(1-methylpyridinium-4-yl)-3-phenylcyclopropane] 2 ClO₄⁻ | | [structure: 5,10-dimethyl-5,10-dihydrophenazine] | blue-green |
| 21 | [structure: 1,2-bis(1-butylpyridinium-4-yl)-3-(1-butylpyridinium-4-yl)-3-cyanocyclopropane] 3 BF₄⁻ | (XXII) | [structure: tetrathiafulvalene] | purple |
| 22 | [structure: 1,2-bis(1-benzylpyridinium-4-yl)-3-benzoylcyclopropane] 2 BF₄⁻ | (XXV) | [structure: 10-butylphenothiazine] | purple |
| 23 | [structure: 1,2-bis(1-methylpyridinium-4-yl)-3,3-dimethyl-3-phenyl-cyclopropane derivative] 2 BF₄⁻ | (XXIII) | [structure: 10-methylphenothiazine] | purple |

TABLE-continued

OX₂ - B - RED₁

24                                                   bluish-red

What is claimed is:

1. An electrochromic system comprising at least one oxidizable substance $RED_1$ which, by releasing electrons at an anode, is converted from a weakly colored or colorless form in to a colored form $OX_1$, and at least one reducible substance $OX_2$ which, by accepting electrons at a cathode, is converted from a weakly colored or colorless form into a colored form $RED_2$, the absorbence in the visible region of the spectrum increasing in each of these cases, and the weakly colored or colorless form being recovered in each case after charge equalization, wherein the reciprocal conversion of oxidized and reducible form takes place by a σ bond being broken or formed, respectively, for $OX_2$, wherein the reducible substance $OX_2$ comprises a cyclic organic compound which after accepting 1 or 2 electrons, is converted, one of the σ bond of the ring being broken, into an open-ring compound and which, by releasing 1 or 2 electrons, is converted once more into the cyclic starting compound, in each case precisely two electrons being transferred overall.

2. The electrochromic system as claimed in claim 1, which comprises, as the reducible substance $OX_2$ which is converted reversibly, a σ bond being broken, into the corresponding substance $RED_2$, a compound selected from the group consisting of the tetrazolium salts, benzotriazolium salts, naphthotriazolium salts, cyclopropanes and [1.1.0] bicyclobutanes.

3. The electrochromic system as claimed in claim 1, which comprises, as the reducible substance $OX_2$, at least one compound of the formulae

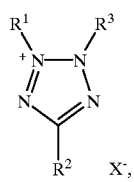

(I)

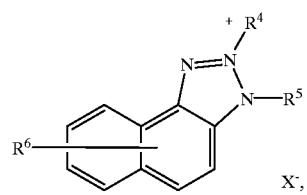

(II)

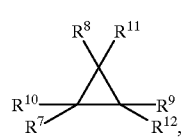

(III)

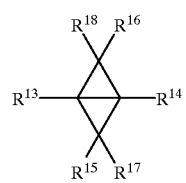

(IV)

in which $R^1$ to $R^5$, independently of one another, represent $C_6$- to $C_{10}$-aryl or an aromatic or quasi-aromatic five- or six-membered heterocyclic ring, each of which is optionally benzanellated, $R^7$, $R^9$, $R^{13}$ and $R^{14}$, independently of one another, represent a radical of the formulae (V) to (VII)

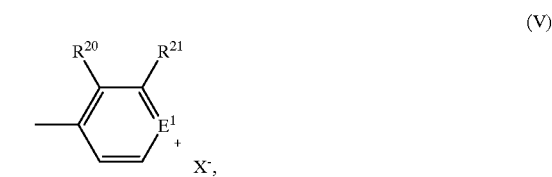

(V)

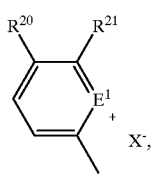

(VI)

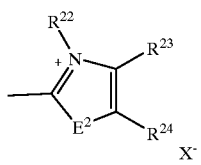

(VII)

$R^8$, $R^{15}$ and $R^{16}$, independently of one another, represent $C_6$- to $C_{10}$-airyl, $C_7$–$C_{11}$-aroyl or a radical of the formulae (V) to (VII), $R^{10}$ to $R^{12}$, $R^{17}$ and $R^{18}$, independently of one another, represent hydrogen, $C_1$- to $C_4$-alkyl, halogen or cyano, $E^1$ and $E^2$, independently of one another, represent O, S or N—$R^{19}$, $R^{19}$ and $R^{22}$, independently of one another, represent $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl, $R^6$, $R^{20}$, $R^{21}$, $R^{23}$ and $R^{24}$, independently of one another, represent hydrogen, $C_1$- to $C_4$-alkyl, $C_1$- to $C_4$-alkoxy, halogen, cyano, nitro or $C_1$- to $C_4$-alkoxycarbonyl, or $R^{20}$ and $R^{21}$, or $R^{23}$ and $R^{24}$, jointly form a —CH═CH—CH═CH— bridge, and $X^-$ represents a colorless anion which is redox-inert under the conditions.

4. The electrochromic system as claimed in claim 1, which comprises, as the oxidizable substance $RED_1$, an organic compound which is able to release 2 electrons reversibly in two stages, the difference of the two oxidation states being preferably at least 250 mV.

5. The electrochromic system as claimed in claim 4, which comprises, as the substance $RED_1$ which is reversibly oxidizable in two stages, a compound of the formulae (VIIII) to (XVII)

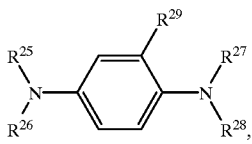

(VIII)

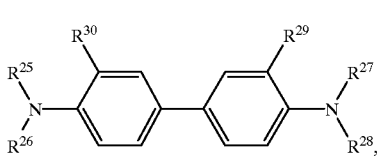

(IX)

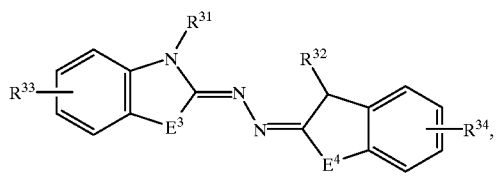

(X)

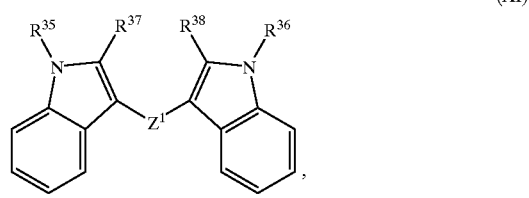

(XI)

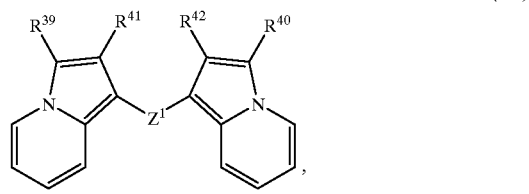

(XII)

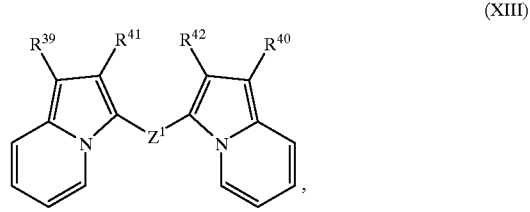

(XIII)

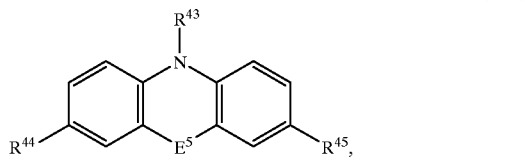

(XIV)

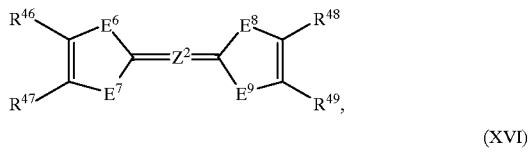

(XV)

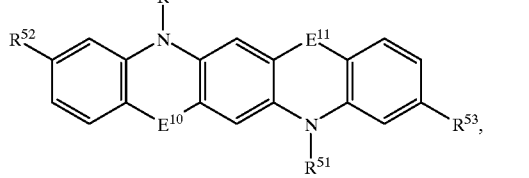

(XVI)

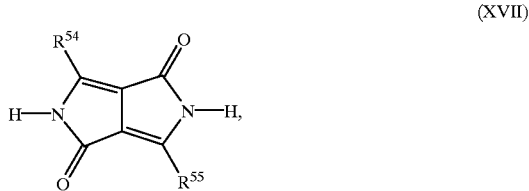

(XVII)

-continued (XVIII)

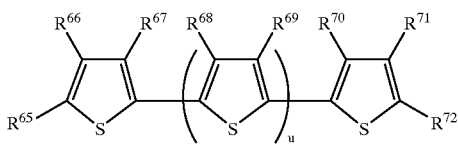

in which

R$^{25}$ to R$^{28}$, R$^{31}$, R$^{32}$, R$^{35}$, R$^{36}$, R$^{43}$, R$^{50}$ and R$^{51}$, independently of one another, represent C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, and R$^{43}$, R$^{50}$ and R$^{51}$ additionally represent hydrogen, R$^{29}$, R$^{20}$, R$^{33}$, R$^{34}$, R$^{37}$, R$^{38}$, R$^{39}$, to R$^{42}$, R$^{44}$, R$^{45}$, R$^{46}$ to R$^{49}$ and R$^{52}$ to R$^{55}$, independently of one another, represent hydrogen, C$_1$- to C$_4$-alkyl, C$_1$- to C$_4$-alkoxy, halogen, cyano, nitro, C$_1$- to C$_4$-alkycaronyl or C$_6$- to C$_{10}$-aryl, and R$^{54}$ and R$^{55}$ additionally represent an aromatic or quasi-aromatic five-or six-membered heterocyclic ring, each of which is optionally benzanellated, or a radical of the formulae (V) or (VI), and R$^{45}$ additionally represents NR$^{73}$R$^{74}$, or R$^{46}$ and R$^{47}$ and/or R$^{48}$ and R$^{49}$ form a —(CH$_2$)$_3$—, —(CH$_2$)$_4$—, —(CH$_2$)$_5$— or —CH=CH— CH=CH-bridge, Z$^1$ represents a direct bond, a —CH=CH— or —N=N— bridge, =Z$^2$= represents a direct double bond, a =CH=CH= or =N—N= bridge, E$^3$ to E$^5$, E$^{10}$ and E$^{11}$, independently of one another, represent O, S, NR$^{56}$ or C(CH$_3$)$_2$, and E$^5$ additionally represents C=O or SO$_2$, or E$^3$ and E$^4$, independently of one another, additionally represent —CH=CH—, E$^6$ to E$^9$, independently of one another, represent S, Se or NR$^{56}$, R$^{56}$, R$^{73}$ and R$^{74}$, independently of one another, represent C$_1$- to C$_{12}$-alkyl, C$_2$- to C$_8$-alkenyl, C$_4$- to C$_7$-cycloalkyl, C$_7$- to C$_{15}$-aralkyl or C$_6$- to C$_{10}$-aryl, and R$^{73}$ additionally represents hydrogen, or R$^{73}$ and R$^{74}$, in the context of NR$^{73}$R$^{74}$, jointly with the N atom to which they are bound form a five- or six-membered saturated ring which may contain further heteroatoms, R$^{65}$ to R$^{72}$, independently of one another, represent hydrogen, C$_1$- to C$_6$-ai-kyl, C$_1$- to C$_4$- alkoxy, cyano, C$_1$- to C$_4$-alkoxycarbonyl or C$_6$- to C$_{10}$-aryl, and R$^{65}$ and R$^{66}$, and R$^{71}$ and R$^{72}$ independently of one another, may additionally form a —(CH$_2$)$_3$—, —(CH$_2$)$_3$—, —(CH$_2$)$_4$— or —CH=CH—CH=CH— bridge, and u represents an integer between 0 and 10.

6. The electrochromic system as claimed in claim 1, which comprises at least one couple of oxidizable and reducible substances RED$_1$/OX$_2$.

7. The electrochromic system as claimed in claim 1, which comprises a couple RED$_1$/OX$_2$, the substance OX$_2$ being a tetrazolinium salt of formula (I) as claimed in claim 3 in which

R$^1$ and R$^2$ correspond to a radical of formula (XIX), (XIX)

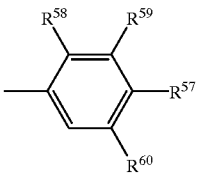

and

R$^3$ corresponds to a radical of formula (XX), (XX)

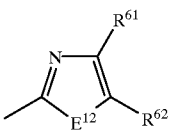

in which

R$^{57}$, R$^{59}$ and R$^{60}$, independently of one another, represent hydrogen, methyl, ethyl, methoxy, ethoxy, cyano, nitro, —N$^+$CH$_3$)$_3$ or COOH, or R$^{57}$ and R$^{59}$ jointly form an —O—CH$_2$—O— bridge, R$^{58}$ represents hydrogen, methyl, methoxy or chlorine, R$^{61}$ represents methyl, difluoromethyl, trifluoromethyl, methoxycarbonyl, ethoxycarbonyl or phenyl, R$^{62}$ represents hydrogen, methyl, ethyl, phenyl or chlorine, or R$^{61}$ and R$^{62}$ together form a —CH=CH—CH=CH— or —CH=CH—C(OCH$_3$)=CH— bridge, E$^{12}$ represents S, X$^-$ represents a colorless anion which is redox-inert under the conditions, and the substance RED, being a compound selected from the group consisting of the formulae (VIII), (X), (XI), (XIV) and (XV) as claimed in claim 6, in which R$^{25}$ to R$^{28}$, R$^{31}$, R$^{32}$, R$^{35}$, R$^{36}$, R$^{43}$ and R$^{56}$ represent methyl, ethyl, propyl, butyl, pentyl, hexyl or benzyl, R$^{25}$ to R$^{28}$, R$^{31}$ and R$^{32}$, and R$^{35}$ and R$^{36}$, respectively, being identical and R$^{43}$ additionally representing hydrogen, R$^{19}$ and R$^{44}$ represent hydrogen, R$^{45}$ represents hydrogen, methoxy, ethoxy, dimethylamino, diethylamino, anilirio, N-methylanilino or piperidino, R$^{33}$ and R$^{34}$ are identical and represent hydrogen, methyl, methoxy, chlorine, cyano or methoxycarbonyl, E$^3$ to E$^5$ represent O, S or NR$^{56}$, but E$^3$ and E$^4$ are identical, R$^{37}$ and R$^{38}$ are identical and represent hydrogen, methyl, ethyl, propyl, butyl or phenyl, Z$^1$ represents a direct bond or —CH=CH—, R$^{46}$ to R$^{49}$ are identical and represent hydrogen, methyl, methoxy, chlorine, cyano, methoxycarbonyl, ethoxycarbonyl or phenyl, E$^6$ to E$^9$ are identical and represent S, Se or NR$^{56}$, =Z$^2$= represents a direct double bond, a =CH—CH= or =N—N= bridge, R$^{65}$ and R$^{66}$, and R$^{71}$ and R$^{72}$ represent a —(CH$_2$)$_3$— or —(CH$_2$)$_4$— bridge, R$^{67}$ to R$^{70}$ represent hydrogen, and u represents an integer from 1 to 6.

8. The electrochromic system as claimed in claim 1, which comprises a couple of oxidizable and reducible substances $RED_1/OX_2$, $RED_1$ and $OX_2$ being linked via a bridge B and $OX_2$ corresponding to a compound of the formulae (I) to (IV) as claimed in claim 3 and $RED_1$ corresponding to one of the formulae (VIII) to (XVIII) as claimed in claim 5, in which B represents a bridge of the formulae —$(CH_2)_n$— or —$[Y^1{}_s$—$(CH_2)_m$—$Y^2]_o$—$(CH_2)_p$—$Y^3{}_q$— which may be substituted by $C_1$- to $C_4$-alkyl, $C_1$- to $C_4$-alkoxy, halogen or phenyl, $Y^1$ to $Y^3$, independently of one another, represent O, S, $NR^{63}$, COO, CONH, NHCONH, cyclopentanediyl; cyclohexanediyl, phenylene or naphthylene, $R^{63}$ represents $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n represents an integer from 1 to 12, m and p, independently of one another, represent an integer from 0 to 8, o represents an integer from 0 to 6, q and s, independently of one another, represent 0 or 1, $R^{19}$, $R^{21}$ to $R^{25}$, $R^{31}$, $R^{35}$, $R^{39}$, $R^{41}$, $R^{43}$, $R^{46}$, $R^{50}$, $R^{54}$, $R^{56}$, $R^{57}$, $R^{59}$, $R^{61}$, $R^{62}$, $R^{64}$, $R^{65}$ or $R^{66}$ form a direct bond to the bridge B, or $R^{46}$, $R^{57}$ or $R^{59}$ form a —COO— bridge to the bridge B.

9. An electrochromic fluid comprising an electrochromic system as claimed claim 1 and at least one inert solvent.

10. An electrochromic device containing an electrochromic fluid as claimed in claim 9.

11. The electrochomic device as claimed in claim 10, which is designed as a cell, as a window pane, mirror, canopy or display.

12. The electrochromic device as claimed in claim 10, which comprises two transparent glass or plastic panes which face one another, one of which optionally being mirrored and whose sides which face one another are coated electroconductively, between which the electrochromic fluid is contained.

13. The electrochromic device as claimed in claim 11, which comprises two transparent glass or plastic panes which face one another, one of which optionally being mirrored and whose sides which face one another are coated electroconductively, between which the elecrochromic fluid is contained.

14. The electrochomic device as claimed in claim 11, which is designed as a cell and the cell is a solar cell.

* * * * *